United States Patent [19]

Kahaney et al.

[11] Patent Number: 5,007,727
[45] Date of Patent: Apr. 16, 1991

[54] COMBINATION PRESCRIPTION LENS AND SUNGLASSES ASSEMBLY

[76] Inventors: Alan Kahaney, 2212 Place Monaco, Del Mar, Calif. 92014; Robert Sved, 39557 Via Temprano, Murietta, Calif. 92362

[21] Appl. No.: 484,884
[22] Filed: Feb. 26, 1990
[51] Int. Cl.⁵ .............................................. G02C 9/00
[52] U.S. Cl. ........................................ 351/47; 351/57
[58] Field of Search ................... 351/44, 47, 57, 60, 351/158; 2/13

[56] References Cited

U.S. PATENT DOCUMENTS 3,171,134  3/1965  Kennedy ............................... 351/47

Primary Examiner—Paul M. Dzierzynski
Attorney, Agent, or Firm—Charles C. Logan, II

[57] ABSTRACT

The novel structure provides a prescription lens assembly that can be detachably mounted on a pair of sunglasses having a one-piece lens. The prescription lens assembly has an elongated flexible plastic support member having a groove formed in its bottom wall that mates with the top edge of the one-piece lens of a pair of sunglasses. The rear wall of the elongated support member has a recess formed therein that receives the top edges of the respective left and right prescription lenses and they are secured in position by a contact adhesive. An elongated cushion strip extends across the rear surfaces of the respective prescription lenses and functions as a cushion to absorb shock from impact and as a third contact point with the head to divide weight of the glasses so no single point puts undue pressure on the wearer.

5 Claims, 1 Drawing Sheet

U.S. Patent Apr. 16, 1991 Sheet 1 of 1 5,007,727
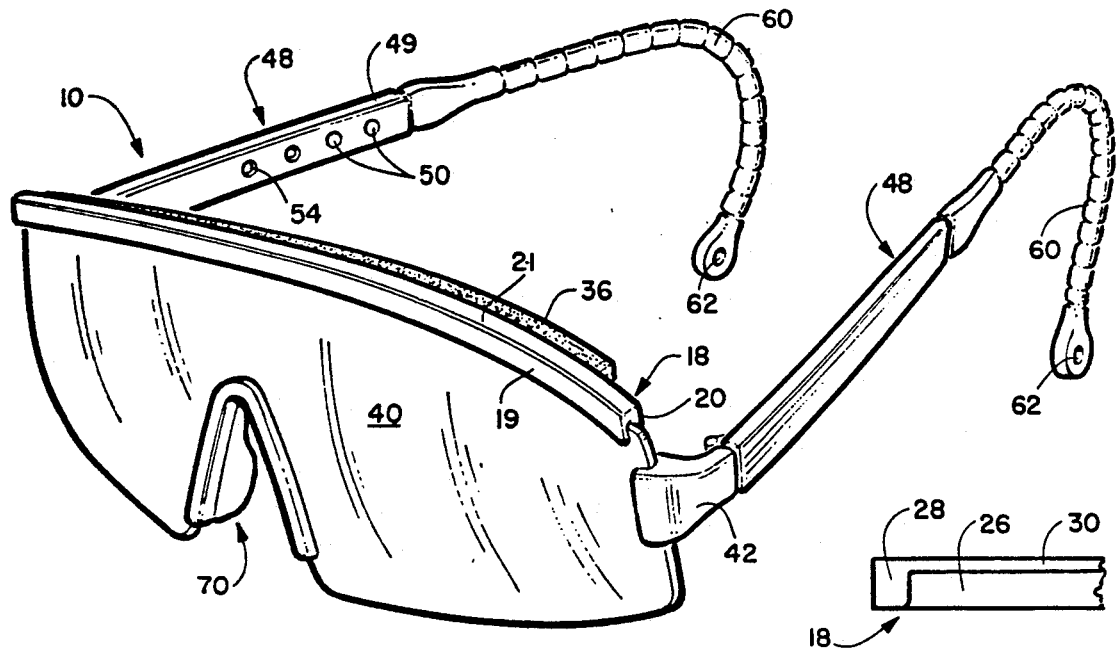
FIGURE 1
FIGURE 5
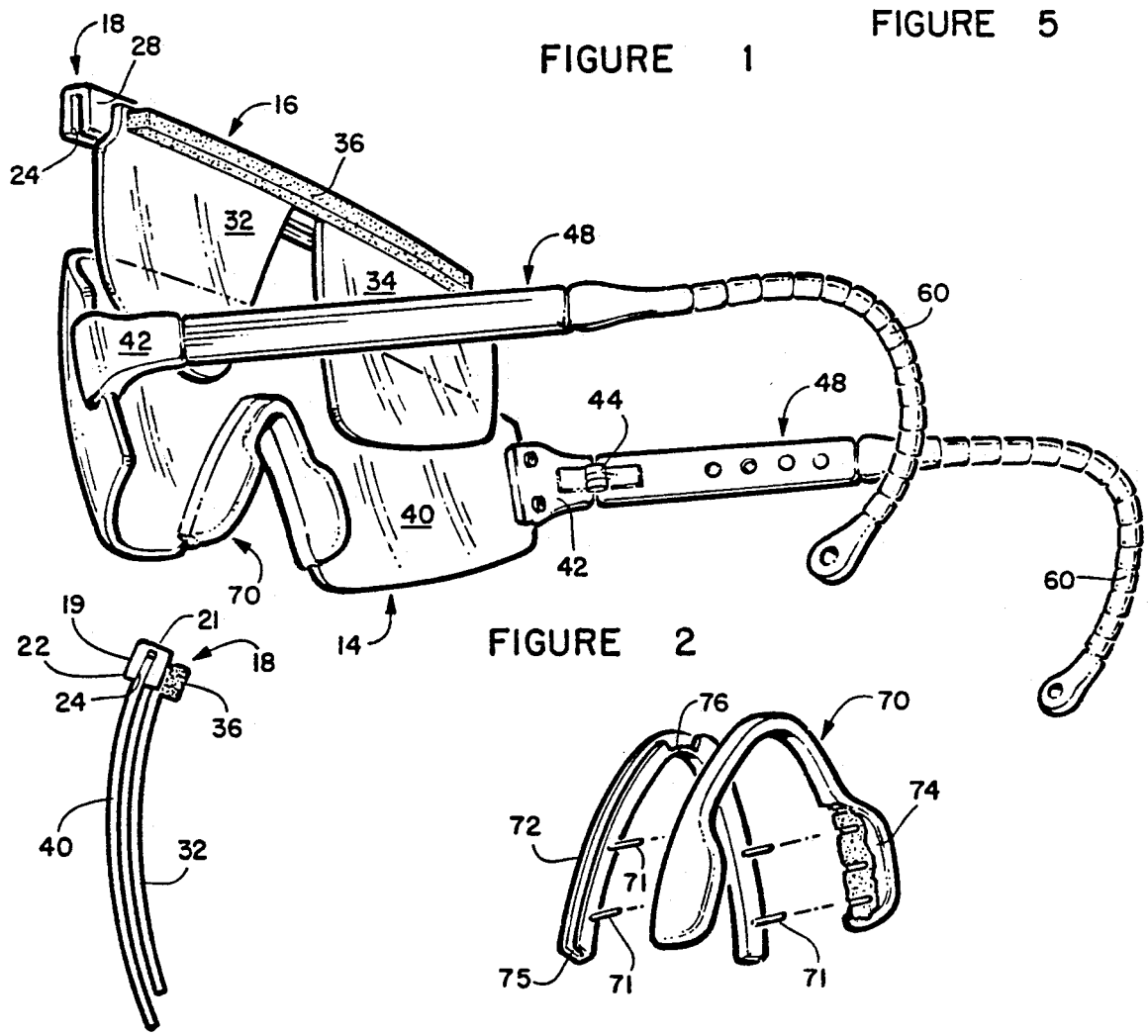
FIGURE 2
FIGURE 3
FIGURE 4

COMBINATION PRESCRIPTION LENS AND SUNGLASSES ASSEMBLY

BACKGROUND OF THE INVENTION

The invention relates glasses and more specifically to a unique prescription lens assembly that can be detachably secured to the top edge of a one-piece sunglasses lens frame.

In the past, there has existed different types of options for people who wear prescription lens glasses and who desire the benefit of sunglasses. One of these alternatives is to have the prescription lenses tinted to the desired darkness. It is often not possible to use tinted sunglasses in low light or indoors for reading.

A second alternative for prescription lens wearers are the individual clip-on sunglass members for each of the respective left and right optical lens of a standard pair of glasses. These have a hinged structure that allows them to be flipped up out of the line of sight of the wearer when they need to read or use the prescription lens glasses in a conventional manner. The obvious drawback to this structure is the appearance of the clip-on units, especially when in their flipped position. While clip-on appliances do function over ordinary prescription spectacles, they are of no use on shield glasses.

With Americans spending more time in active outdoor sports, there has been tremendous growth in the number of people wearing sport sunglasses during different activities. The present structure of these sunglasses does not allow the wearer the option of utilizing prescription lenses with them.

The one piece lens or "shield style" glasses are the best for sports for the following reasons:

(A). The best protection to the eye from inpacts and foreign bodies.

(B). Block harmful ultra violet rays.

(C). They give the widest field of vision, especially when they are frameless or "rimless".

It is an object of the invention to provide a novel prescription lens assembly that can be detachably secured to the top edge of a one-piece sunglasses lens of a pair of sport sunglasses.

It is also an object of the invention to provide a novel prscription lens assembly that allow it to be quickly and easily attached and detached from a pair of sport sunglasses having a one piece sunglass assembly.

It is another object of the invention to provide a novel prescription lens assembly that is economical to manufacture and market.

It is a further object of the invention to provide a novel prescription lens assembly that is cosmetically appealing to persons wearing glasses so they can be worn in conjunction with a pair of sport sunglasses having a one-piece sunglass lens. Since the majority of todays shield glasses are mirrored (to reflect the light) the prescription lenses are virtually impossible to see.

It is a further object of the invention to provide a novel prescription lens assembly whose weight is minimal so when mounted on the one-piece sunglasses lens of a pair of sport sunglasses, it will not produce discomfort for the wearer.

SUMMARY OF THE INVENTION

Applicant's novel invention relates to a prescription lens assembly that may be detachably mounted on the top edge of a one-piece sunglasses lens of a pair of sport sunglasses. The structure has for a primary component, an elongated flexible plastic support member that approximates the width of a one-piece sunglasses lens. The support member has a front wall, a top wall, a rear wall, and a bottom wall having a groove that extends the length of the support member. This is the structure for detachably receiving the top edge of the one-piece sunglasses lens.

The rear wall of the support member has a recess formed therein that extends across most of the length of the support member with the recess being limited at each of its ends by a boss of knob that functions to capture the outer lateral edges of the respective left and right prescription lens. The recess also forms a rearwardly extending flange along the top edge of the rear wall of the support member. The individual left and right prescription lenses have a adhesive applied along their front top edge and are pressed into the recess where they are securely mounted. An elongated cushion strip having adhesive along its front edge is attached to the rear surface of the respective prescription lenses and this functions as a cushion to absorb shock from impact and as a third contact point with the head to divide weight of the glasses so no single point puts undue pressure on the wearer.

The sunglass used with the novel prescription lens assembly has a one-piece sunglasses lens. Temple brackets are mounted at its opposite outer edges and any of a wide range of different temple structures can be secured thereto. The noseguard assembly secured to the one-piece sunglasses lens has a secondary function to frictionally engage the inner edges of the respective left and right prescription lenses when the prescription lens assembly is attached to the sport sunglasses.

The prescription lenses have a 6.00 diopter base curve (standard optical curve of most prescription lenses) and they may be made from plastic or polycarbonate material. The curvature of the front surface of these prescription lenses approximates the rear curvature of the one-piece sunglasses lens when they are in their combined or nested position.

DESCRIPTION OF THE DRAWING

FIG. 1 is a front perspective view of a pair of sport sunglasses having the novel prescription lens assembly secured thereto;

FIG. 2 is a rear perspective view showing in exploded manner how the prescription lens assembly attaches to the top edge of the one-piece sunglasses lens of the sport sunglasses;

FIG. 3 is a schematic side elevation view illustrating how the prescription lenses nest in a position rearward of the one-piece sunglass lens;

FIG. 4 is an exploded view of the nose guard assembly; and FIG. 5 is a partial rear elevation view of the support member.

DESCRIPTION OF THE PREFERRED EMBODIMENT

The novel combination prescription lens and sunglasses assembly will now be described by referring to FIGS. 1-5 of the drawing. The combination structure is generally designated numeral 10. The major components are a pair of sport sunglasses 14 and the prescription lens assembly 16.

Prescription lens assembly 16 has an elongated plastic support member 18 having a front wall 19, a rear wall 20, a top wall 21 and a bottom wall 22. A groove 24 is formed in bottom wall 22 for recieving the top edge of the lens of sunglasses assembly 14. A recess 26 is formed in the rear wall 20 and it extends across most of the length of support member 18 and where the recess does not exist, a pair of bosses or knobs 28 are formed. The recess also forms a flange 30 adjacent its top edge that extends rearwardly. The respective left prescription lens 32 and right prescription lens 34 have a contact adhesive applied to their front top edges and they are pressed to recess 26 so that their outer lateral edges are captured by the respective bosses 28. An elongated cushion strip 36 has an adhesive on its front surface that is pressed into engagement with the top rear surface of the respective prescription lenses 32 and 34.

The sunglasses assembly 14 that is illustrated has a one-piece sunglasses lens 40. Temple brackets 42 are mounted adjacent its opposite ends. Hinge assemblies 44 have adjustable temple assemblies 48 secured thereto.

Adjustable temple assembly 48 has a tubular sleeve 49 with a plurality of apertures 50 along its inner suface. Head portion 52 has an elongated member that is received into tubular sleeve 48 and its has plurality of protrusions 54 that mate with apertures 50. A bendable leg 60 is formed adjacent the end of head portion 52. An aperture 62 is formed at the outer end of bendable legs 60.

Nose guard assembly 70 has a front half member 72 and a rear half member 74. Front half member has groove 75 that receives the bottom edge of sunglasses lens 40. A notch 76 is formed adjacent the arch portion of front half member 72. A plurality of alignment pins 77 extend rearwardly and are received in mating recesses in the front surface or rear half member 74. The nose guard assembly of sunglasses assembly 14 performs a second function when the prescription lens assembly is secured in place. The inside edges of the respective prescription lenses 32 and 34 are wedged into frictional contact with portions of the rear half member 74.

What is claimed is:

1. A combination prescription lens and sunglasses assembly comprising:
   a pair of sunglasses having a one-piece lens having a longitudinally extending top edge;
   a left eye prescription lens having a top edge, an inside edge, a front surface and a rear surface;
   a right eye prescription lens having a top edge, an inside edge, a front surface, and a rear surface;
   an elongated support member having a predetermined length, said support member having a top wall, a front wall, a rear wall and a bottom wall, said elongated support member having an arcuate longitudinal curvature when viewed in top plan view;
   means for fixedly securing the top edges of said respective left and right prescription lenses to the rear wall of said elongated support member to form a prescription lens assembly; and
   mounting means for detachably securing said elongated support bar on the top edge of the one piece lens of said pair of sunglasses so that said prescription lenses are positioned rearwardly of the one-piece lens of said sunglasses, said mounting means is a longitudinally extending groove in the bottom wall of said elongated support member.

2. A combination prescription lens and sunglasses assembly as recited in claim 1 wherein said elongated support member is made of a flexible plastic material.

3. A combination prescription lens and sunglasses assembly as recited in claim 1 wherein said elongated support member has an arcuate longitudinal curvature when viewed in a front elevation view.

4. A combination prescription lens and sunglasses assembly as recited in claim (1) 1 further comprising an elongated cushion strip attached to the rear (wall) surfaces of said (elongated support member) right and left prescription lenses.

5. A combination prescription lens and sunglasses assembly as recited in claim 1 further comprising a nose guard assembly detachably mounted on the one-piece lens of said sunglasses.

* * * * *